United States Patent
Ogawa (10) Patent No.: US 12,205,583 B2
(45) Date of Patent: Jan. 21, 2025

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Hirofumi Ogawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 412 days.

(21) Appl. No.: 17/519,508

(22) Filed: Nov. 4, 2021

(65) Prior Publication Data
US 2022/0399018 A1  Dec. 15, 2022

(30) Foreign Application Priority Data
Jun. 15, 2021  (JP) .................................. 2021-099486

(51) Int. Cl.
*G10L 21/00* (2013.01)
*G10L 15/22* (2006.01)
*G10L 25/00* (2013.01)
*H04N 1/00* (2006.01)

(52) U.S. Cl.
CPC ......... *G10L 15/22* (2013.01); *H04N 1/00403* (2013.01); *H04N 1/00482* (2013.01); *G10L 2015/223* (2013.01)

(58) Field of Classification Search
None
See application file for complete search history.

(56) References Cited

U.S. PATENT DOCUMENTS

| 11,302,321 | B2  | 4/2022 | Iwasa    |          |
|------------|-----|--------|----------|----------|
| 2020/0193991 | A1* | 6/2020 | Saito    | G06F 3/167 |
| 2021/0304700 | A1* | 9/2021 | Fujimori | G09G 5/003 |

FOREIGN PATENT DOCUMENTS

| JP | 2003051887 | 2/2003  |
|----|------------|---------|
| JP | 2015227951 | 12/2015 |
| JP | 2020087347 | 6/2020  |

OTHER PUBLICATIONS

"Office Action of Japan Counterpart Application", issued on Nov. 19, 2024, with English translation thereof, pp. 1-6.

* cited by examiner

*Primary Examiner* — Satwant K Singh
(74) *Attorney, Agent, or Firm* — JCIPRNET (57) ABSTRACT

An information processing apparatus includes a processor configured to receive a request for a process based on a spoken voice of a user, and in a case where the request includes a first setting and a second setting that are in a prohibition relationship, perform a control for performing the process with the first setting in a case where the first setting is spoken earlier than the second setting in the spoken voice.

12 Claims, 9 Drawing Sheets

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-099486 filed Jun. 15, 2021.

BACKGROUND (i) Technical Field

The present invention relates to an information processing apparatus and a non-transitory computer readable medium storing a program.

(ii) Related Art

JP2015-227951A discloses a speaking apparatus that is a speaking apparatus having a speaking function based on voice and includes a determination section that determines whether or not two or more pieces of speaking data speakable at a time of speaking are present for speaking data of which a speakable period is set in advance, and a speaking section that, in a case where the determination section determines that the two or more pieces of the speaking data speakable at the time of speaking are present, preferentially speaks speaking data of which a priority level associated in advance with each of the two or more pieces of the speaking data speakable at the time of speaking is high.

SUMMARY

A request for a process based on a spoken voice of a user may include settings that are in a prohibition relationship. In this case, performing the process with a setting that is selected in a case where a request for the process based on an operation on a screen includes the settings in the prohibition relationship results in a possibility that the process is not performed with a setting intended by the user. For example, in a case where the request for the process based on the operation on the screen includes the settings in the prohibition relationship, a setting that is set later is generally selected. Meanwhile, in a case where the request for the process based on the spoken voice of the user includes the settings in the prohibition relationship, a setting that is spoken earlier is generally prioritized. Thus, selecting a setting that is spoken later results in a possibility that the setting intended by the user is not necessarily selected.

Aspects of non-limiting embodiments of the present disclosure relate to an information processing apparatus and a non-transitory computer readable medium storing a program that, in a case where a request for a process based on a spoken voice of a user includes settings which are in a prohibition relationship, increase a possibility of performing the process with a setting intended by a user, compared to a configuration in which the process is performed with a setting that is selected in a case where a request for the process based on an operation on a screen includes the settings in the prohibition relationship.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive a request for a process based on a spoken voice of a user, and in a case where the request includes a first setting and a second setting that are in a prohibition relationship, perform a control for performing the process with the first setting in a case where the first setting is spoken earlier than the second setting in the spoken voice.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Outline of Present Exemplary Embodiment

The present exemplary embodiment provides an information processing apparatus that receives a request for a process based on a spoken voice of a user, and in a case where the request includes a first setting and a second setting which are in a prohibition relationship, performs a control for performing the process with the first setting in a case where the first setting is spoken earlier than the second setting in the spoken voice.

Meanwhile, in a case where the first setting is performed earlier than the second setting by an operation on a screen, the information processing apparatus generally performs a control for performing the process with the second setting. That is, the present exemplary embodiment also provides an information processing apparatus that receives a request for a process based on a spoken voice of a user, and in a case where the request includes a first setting and a second setting which are in a prohibition relationship, performs a control for performing the process with, out of the first setting and the second setting, a setting different from a setting which is selected in a case where a request for the process based on an operation on a screen is received.

Here, the process may be any process executed by various apparatuses such as a computer. Hereinafter, printing will be illustratively described as the process. The setting is a condition when the process is executed. In a case where the process is printing, the setting is a printing setting.

In addition, the prohibition relationship between two settings refers to a relationship in which two settings compete with each other, that is, a relationship in which two settings cannot be compatible. Here, while two settings in the prohibition relationship are focused, two settings among three or more settings in the prohibition relationship may be focused.

Furthermore, in a printing system including a smart speaker that collects voice of the user, and a printing apparatus that performs printing based on an instruction from the smart speaker, the information processing apparatus may be the smart speaker or the printing apparatus. A server that performs relaying between the smart speaker and the printing apparatus is provided below, and the information processing apparatus will be illustratively described as the server.

Overall Configuration of Printing System

Figure 1:
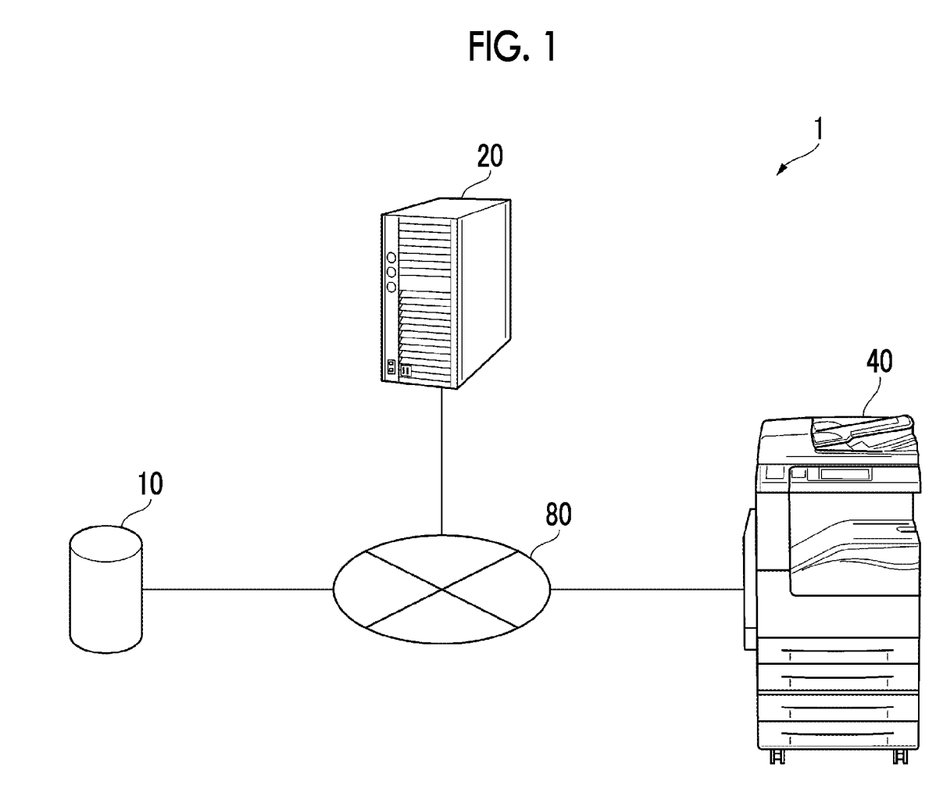
FIG. 1 is a diagram illustrating an overall configuration example of a printing system in an exemplary embodiment of the present invention.

FIG. 1 is a diagram illustrating an overall configuration example of a printing system 1 in the present exemplary embodiment. As illustrated, the printing system 1 is configured by connecting a smart speaker 10, a server 20, and a printing apparatus 40 to a communication line 80. While only one smart speaker 10, one server 20, and one printing apparatus 40 are illustrated in the drawing, two or more of each apparatus may be provided.

The smart speaker 10 is a speaker that has a voice assistant function and can obtain various information and respond via the communication line 80 in response to a query based on voice from the user, or control operations of various apparatuses. The smart speaker 10 is referred to as an AI speaker. Particularly, in the present exemplary embodiment, in a case where the user makes the printing request by voice, the smart speaker 10 recognizes the voice of the printing request, generates request information for requesting printing based on a result of recognition, and transmits the request information to the server 20.

The server 20 performs various processes based on information transmitted from the smart speaker 10. Particularly, in the present exemplary embodiment, the server 20 receives the request information for requesting printing from the smart speaker 10 and transmits a printing instruction based on the request information to the printing apparatus 40. In the present exemplary embodiment, the server 20 is provided as an example of the information processing apparatus.

The printing apparatus 40 prints an image on a recording medium such as paper. Particularly, in the present exemplary embodiment, the printing apparatus 40 prints the image on the recording medium based on the printing instruction transmitted from the server 20.

The communication line 80 is a line used for information communication between the smart speaker 10 and the server 20 and between the server 20 and the printing apparatus 40. For example, the Internet may be used as the communication line 80.

Hardware Configuration of Smart Speaker

Figure 2:
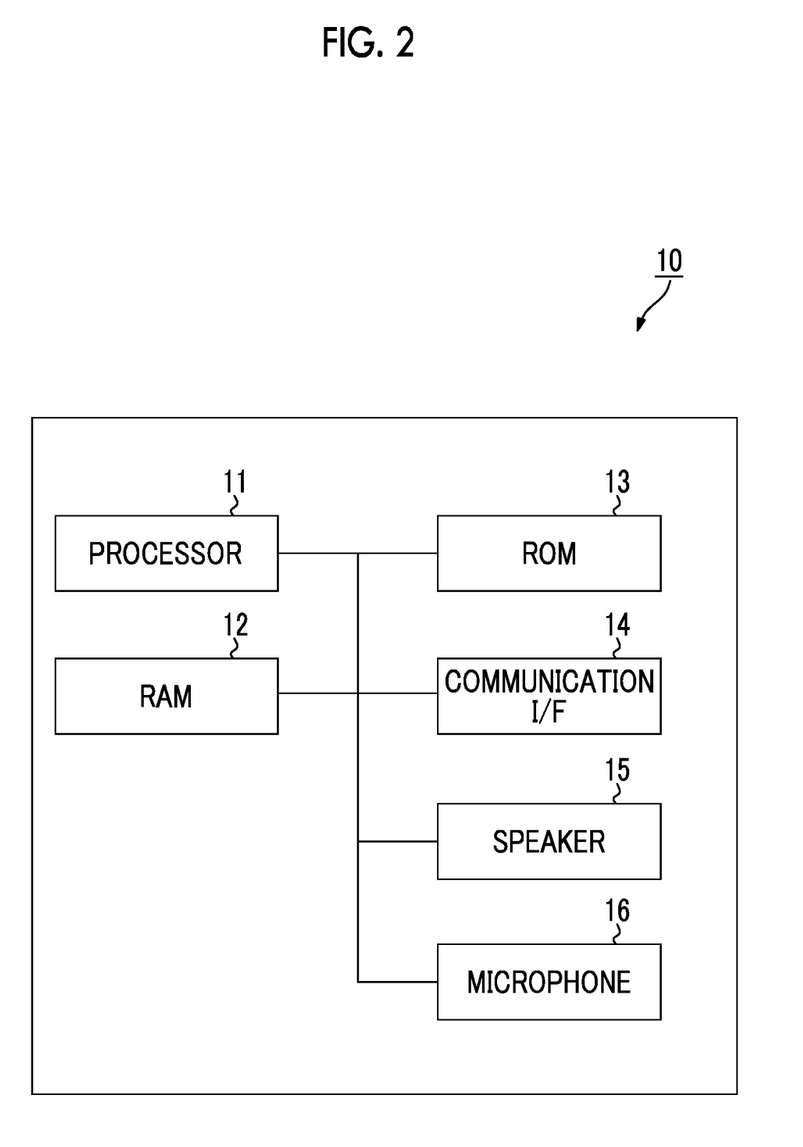
FIG. 2 is a diagram illustrating a hardware configuration example of a smart speaker in the exemplary embodiment of the present invention.

FIG. 2 is a diagram illustrating a hardware configuration example of the smart speaker 10 in the present exemplary embodiment. As illustrated, the smart speaker 10 includes a processor 11, a random access memory (RAM) 12, a read only memory (ROM) 13, a communication interface (hereinafter, referred to as a "communication I/F") 14, a speaker 15, and a microphone 16.

The processor 11 implements a process for input and output of voice by loading various programs stored in the ROM 13 or the like into the RAM 12 and executing the various programs. Such a process includes, for example, a process of generating voice data for outputting voice by the speaker 15 and a process of recognizing the voice of the printing request collected by the microphone 16 and converting the voice of the printing request into the request information.

The RAM 12 is a memory used as a work memory or the like of the processor 11. The ROM 13 is a memory storing the various programs or the like executed by the processor 11.

The communication I/F 14 transmits and receives various information to and from the server 20 via the communication line 80.

The speaker 15 outputs voice based on the voice data generated by the processor 11 to an outside. The microphone 16 collects voice emitted outside.

Hardware Configuration of Server

Figure 3:
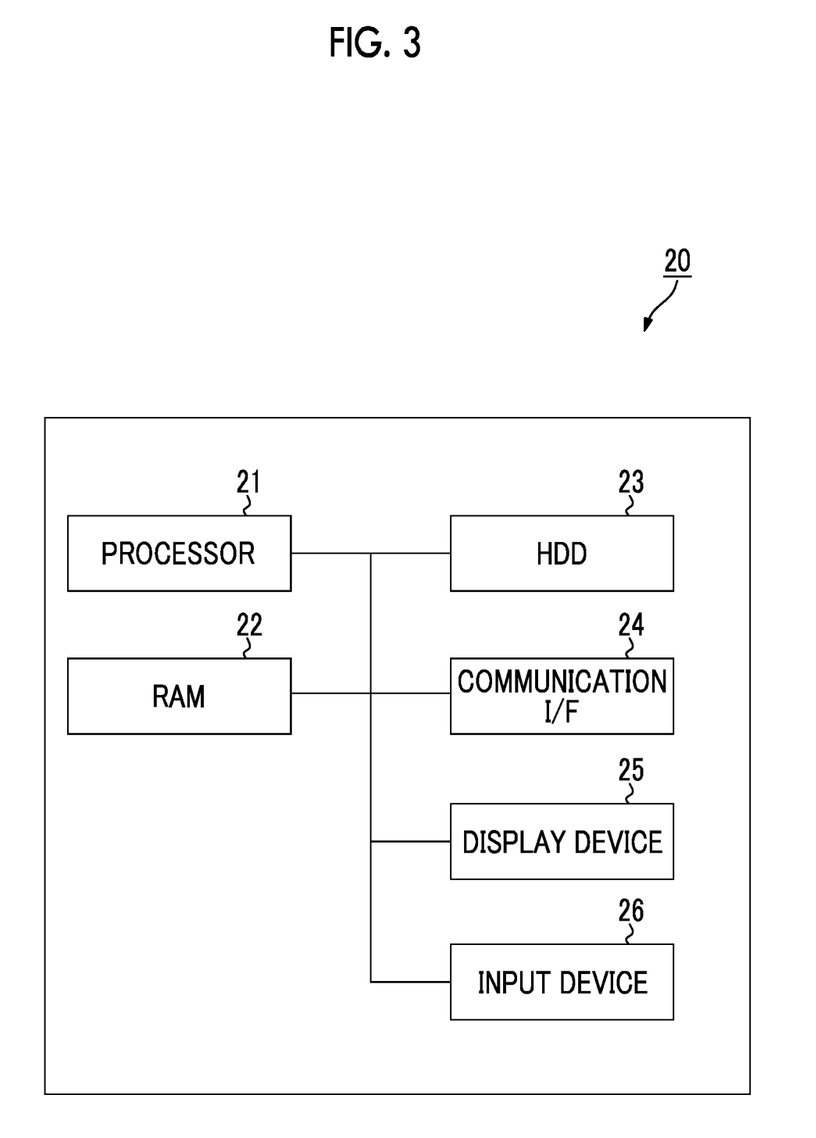
FIG. 3 is a diagram illustrating a hardware configuration example of a server in the exemplary embodiment of the present invention.

FIG. 3 is a diagram illustrating a hardware configuration example of the server 20 in the present exemplary embodiment. As illustrated, the server 20 includes a processor 21, a RAM 22, a hard disk drive (HDD) 23, a communication I/F 24, a display device 25, and an input device 26.

The processor 21 implements each function described later by executing various software such as an operating system (OS) and applications.

The RAM 22 is a memory used as a work memory or the like of the processor 21. The HDD 23 is, for example, a magnetic disk apparatus storing input data for various software, output data from various software, and the like.

The communication I/F 24 transmits and receives various information to and from the smart speaker 10 or the printing apparatus 40 via the communication line 80.

The display device 25 is, for example, a display that displays various information. The input device 26 is, for example, a keyboard or a mouse used for inputting information by the user.

Hardware Configuration of Printing Apparatus

Figure 4:
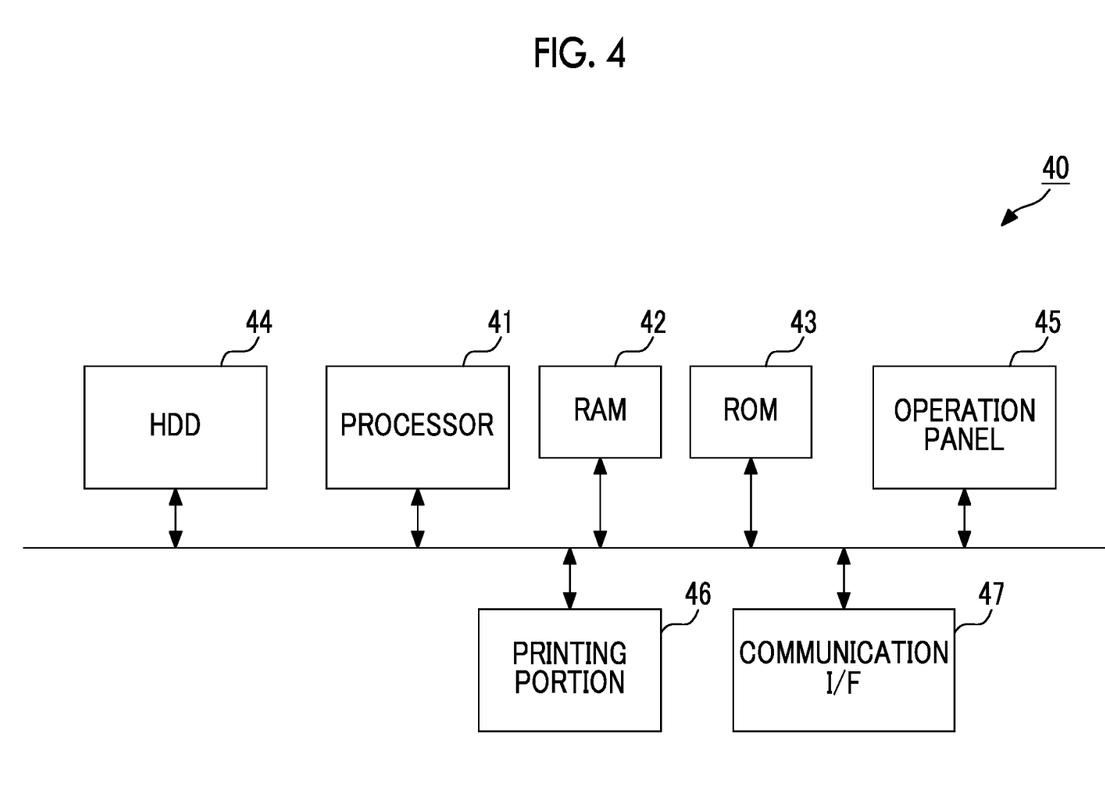
FIG. 4 is a diagram illustrating a hardware configuration example of a printing apparatus in the exemplary embodiment of the present invention.

FIG. 4 is a diagram illustrating a hardware configuration example of the printing apparatus 40 in the present exemplary embodiment. As illustrated, the printing apparatus 40 includes a processor 41, a RAM 42, a ROM 43, an HDD 44, an operation panel 45, a printing portion 46, and a communication I/F 47.

The processor 41 implements a process for printing in the printing portion 46 by loading various programs stored in the ROM 43 or the like into the RAM 42 and executing the various programs.

The RAM 42 is a memory used as a work memory or the like of the processor 41. The ROM 43 is a memory storing the various programs or the like executed by the processor 41. The HDD 44 is, for example, a magnetic disk apparatus storing printing data or the like used in printing in the printing portion 46.

The operation panel 45 is, for example, a touch panel that displays various information and receives an operation input from the user. Here, the operation panel 45 consists of a display on which various information are displayed, and a position detection sheet that detects a position of an instruction issued by instruction means such as a finger or a stylus pen. Alternatively, a display and a keyboard may be used instead of the touch panel.

The printing portion 46 prints the image on the recording medium such as paper. Here, the printing portion 46 is, for example, a printer. An electrophotographic type that forms the image by transferring toner attached to a photoconductor to the recording medium, or an ink jet type that forms the image by ejecting ink to the recording medium may be used.

The communication I/F 47 transmits and receives various information to and from the server 20 via the communication line 80.

Schematic Operation of Present Exemplary Embodiment

Figure 5:
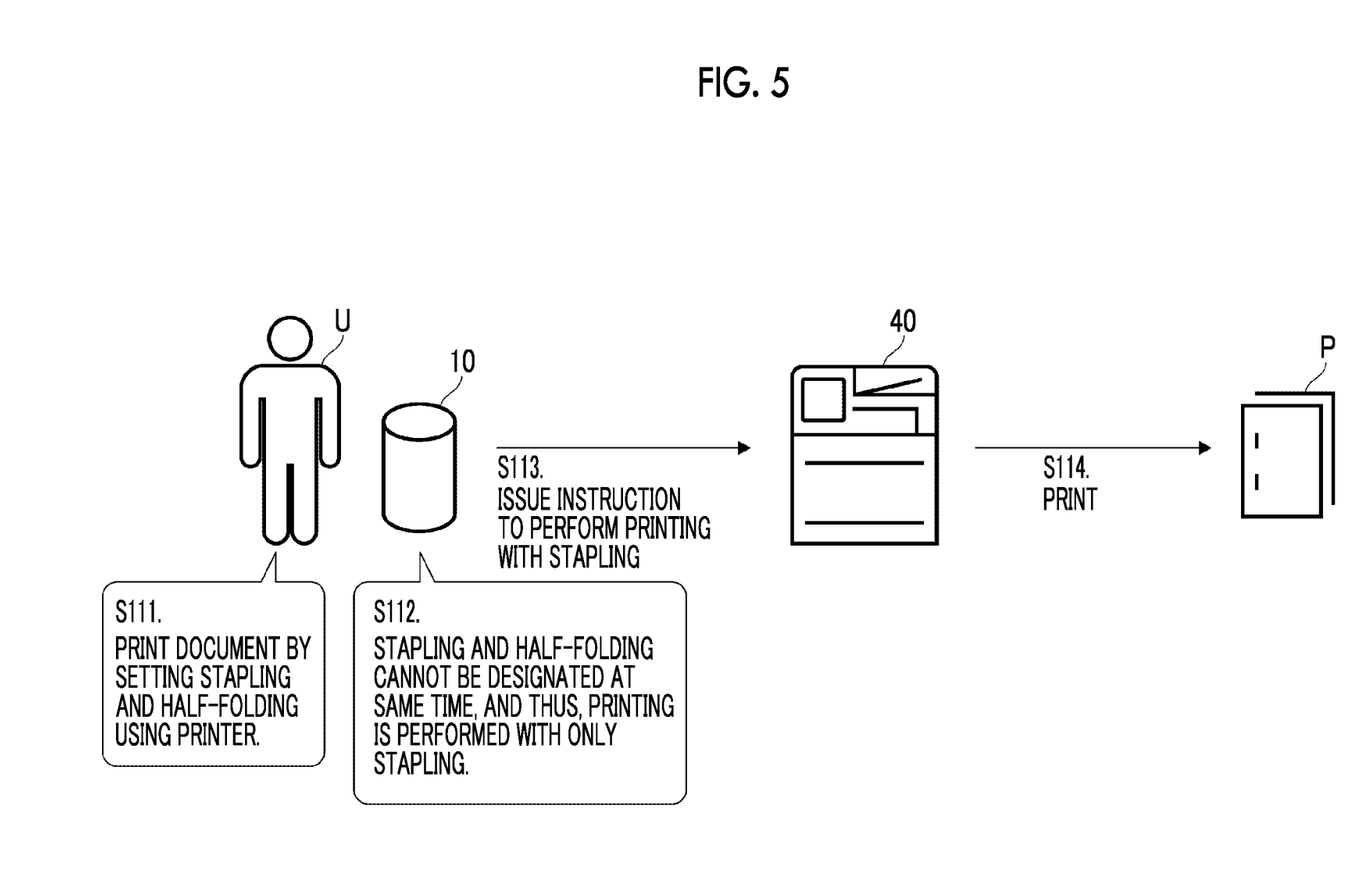
FIG. 5 is a diagram for describing a first schematic operation of the exemplary embodiment of the present invention.
Figure 6:
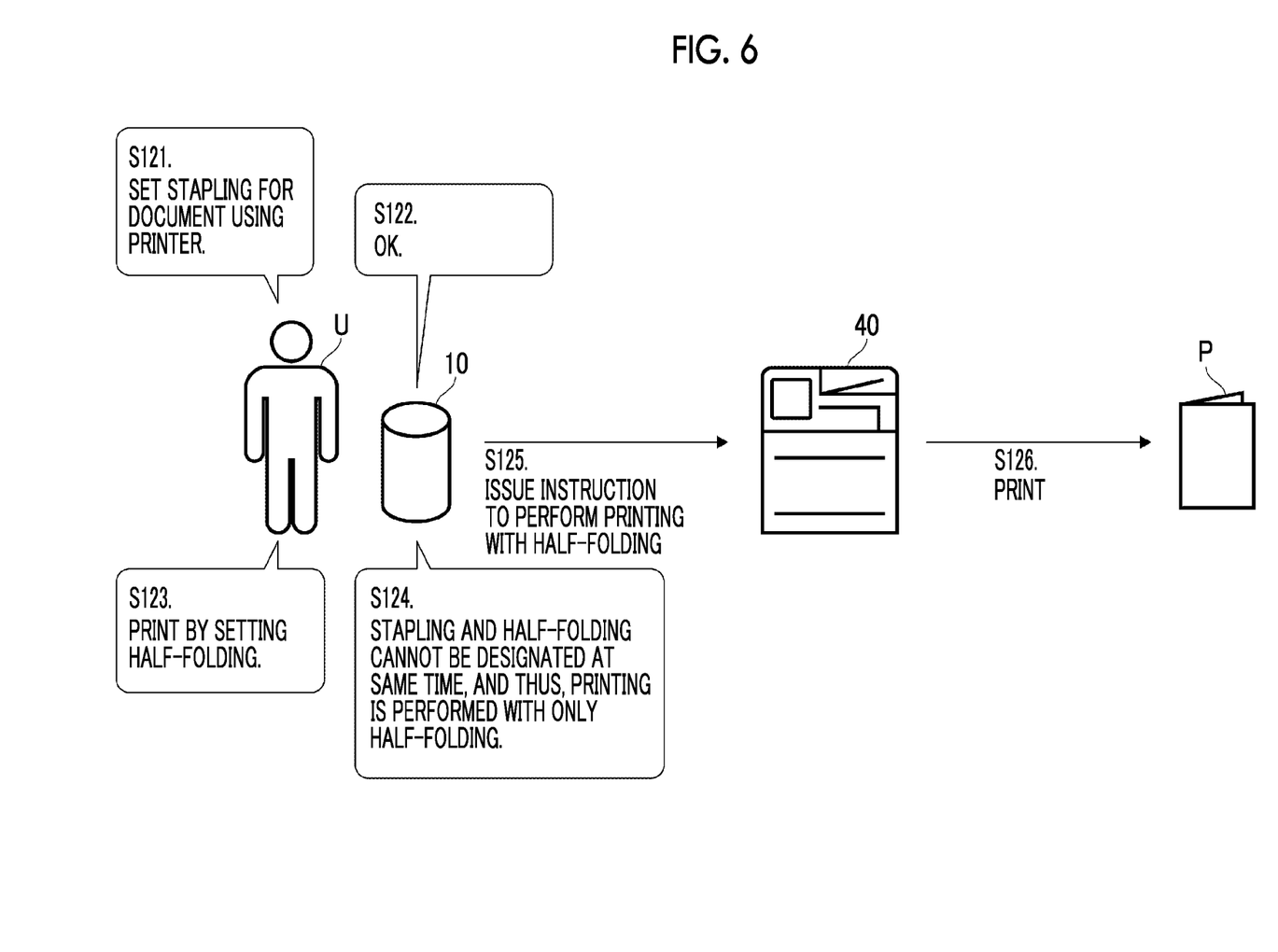
FIG. 6 is a diagram for describing a second schematic operation of the exemplary embodiment of the present invention.
Figure 7:
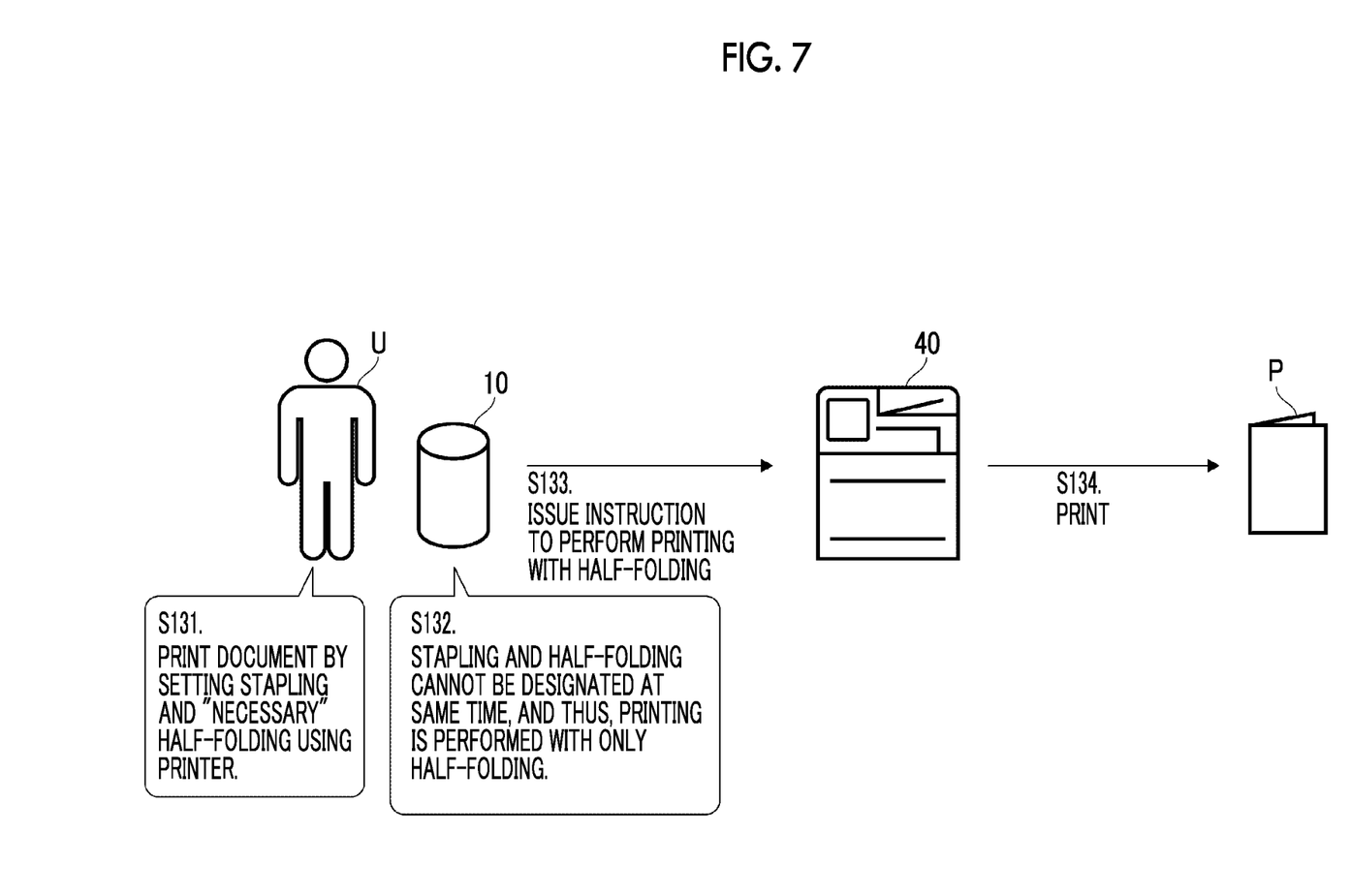
FIG. 7 is a diagram for describing a third schematic operation of the exemplary embodiment of the present invention.

FIG. 5 to FIG. 7 are diagrams for describing a schematic operation of the present exemplary embodiment. These drawings do not include the server 20 and illustrate that the printing instruction is directly transmitted to the printing apparatus 40 from the smart speaker 10. In addition, in a case where making a query to the smart speaker 10, the user generally makes a call for starting using the voice assistant function of the smart speaker 10. However, this call is not illustrated in the drawings.

In the present specification, a setting when final printing is performed by the printing apparatus 40 will be referred to as the printing setting, and a setting of printing included in the printing request when the user makes the printing request will be referred to as a requested setting.

FIG. 5 illustrates a first schematic operation of the printing system 1. In the first schematic operation, in a case where the user speaks the printing request, and two requested settings in the prohibition relationship are included in the printing request, printing is performed by resolving prohibition using a speaking order as a priority, that is, by deciding the requested setting earlier in the speaking order as the printing setting.

In the drawing, first, a user U requests the smart speaker 10 to print a document by setting stapling and half-folding using the printing apparatus 40 (step S111). Here, stapling and half-folding are assumed to be in the prohibition relationship. In this case, stapling that is earlier in the speaking order is selected as the printing setting. Therefore, the smart speaker 10 informs the user U that stapling and half-folding cannot be designated at the same time, and thus, printing is performed with only stapling (step S112). The printing instruction for issuing an instruction to perform printing with stapling is transmitted to the printing apparatus 40 from the smart speaker 10 (step S113). Accordingly, the printing apparatus 40 prints a stapled printed matter P (step S114).

While the smart speaker 10 informs the user U that printing is performed with only stapling in step S112, and then, the printing instruction is transmitted to the printing apparatus 40 in step S113 without waiting for a response of the user, the present invention is not limited thereto. The smart speaker 10 may ask the user U whether or not to perform printing with only stapling in step S112. In a case where the user U responds that printing may be performed with only stapling, the printing instruction may be transmitted to the printing apparatus 40 in step S113.

Hereinafter, a case where the printing instruction is transmitted to the printing apparatus 40 without waiting for the response of the user will be illustratively described.

In addition, while the requested setting earlier in the speaking order is decided as the printing setting in a case where the user makes the printing request by the spoken voice, the present invention is not limited thereto. Even in a case where the user makes the printing request by the spoken voice, the requested setting later in the speaking order may be decided as the printing setting in a case where prioritization of the requested setting later in the speaking order is set in advance. Hereinafter, in a case where the user makes the printing request by the spoken voice, the requested setting earlier in the speaking order will be basically decided as the printing setting.

FIG. 6 illustrates a second schematic operation of the printing system 1. The second schematic operation is obtained by adding an operation of a modification example to the first schematic operation. The operation of the modification example is an operation of, in a case where the user speaks the printing request in two speaking units, and two requested settings in the prohibition relationship are included in different speaking units, performing printing by deciding the requested setting later in the speaking order as the printing setting. In addition to the case where two requested settings in the prohibition relationship are included in different speaking units, a response of the smart speaker 10 between two speaking units is set as a condition for deciding the requested setting later in the speaking order as the printing setting.

In the drawing, first, the user U tries to request the smart speaker 10 to print the document by setting stapling using the printing apparatus 40 (step S121). The smart speaker 10 shortly responds to the request (step S122). Then, the user U makes a request for printing by setting half-folding (step S123). Here, stapling and half-folding are assumed to be in the prohibition relationship. In this case, half-folding that is later in the speaking order is selected as the printing setting. Therefore, the smart speaker 10 informs the user U that stapling and half-folding cannot be designated at the same time, and thus, printing is performed with only half-folding (step S124). The printing instruction for issuing an instruction to perform printing with half-folding is transmitted to the printing apparatus 40 from the smart speaker 10 (step S125). Accordingly, the printing apparatus 40 prints the half-folded printed matter P (step S126).

While the requested setting later in the speaking order is decided as the printing setting in a case where two requested settings in the prohibition relationship are included in different speaking units, and the smart speaker responds between the speaking units, the present invention is not limited thereto. In a case where two requested settings in the prohibition relationship are included in different speaking units, the requested setting later in the speaking order may be decided as the printing setting even without the response of the smart speaker 10 between the speaking units. For example, in a case where two requested settings in the prohibition relationship are included in different speaking units, and a length of a time period between the speaking units is greater than or equal to a reference, the requested setting later in the speaking order may be decided as the printing setting. Hereinafter, deciding the requested setting later in the speaking order as the printing setting in a case where two requested settings in the prohibition relationship are included in different speaking units, and the smart speaker 10 responds between the speaking units will be illustratively described.

In addition, while the requested setting later in the speaking order is decided as the printing setting in a case where two requested settings in the prohibition relationship are included in different speaking units, the present invention is not limited thereto. Even in a case where two requested settings in the prohibition relationship are included in different speaking units, the requested setting earlier in the speaking order may be decided as the printing setting in a case where prioritization of the requested setting earlier in the speaking order is set in advance. Hereinafter, deciding the requested setting later in the speaking order as the printing setting in a case where two requested settings in the prohibition relationship are included in different speaking units will be illustratively described.

Furthermore, while the number of speaking units spoken by the user is two, the present invention is not limited thereto. The number of speaking units spoken by the user may be greater than or equal to three. Hereinafter, a case where the number of speaking units spoken by the user is two will be illustratively described.

FIG. 7 illustrates a third schematic operation of the printing system 1. The third schematic operation is also obtained by adding an operation of a modification example to the first schematic operation. Here, the operation of the modification example is an operation of, in a case where the user speaks the printing request, and a plurality of requested settings in the prohibition relationship are included in the printing request, performing printing by resolving prohibition by adding a keyword to the requested setting to change the priority.

In this case, the keyword may be added to the requested setting earlier in the speaking order or may be added to the requested setting later in the speaking order. Hereinafter, the latter will be illustratively described. In addition, the keyword may be added before or after the requested setting. Hereinafter, a case of adding the keyword before the requested setting will be illustratively described. Furthermore, adding the keyword may decrease or increase the priority. For example, increasing the priority by adding "necessary" before the requested setting later in the speaking order is considered. For example, decreasing the priority by adding "after" before the requested setting later in the speaking order is considered. Such a keyword may be predetermined and stored.

In the drawing, first, the user U requests the smart speaker 10 to print the document by setting stapling and necessary half-folding using the printing apparatus 40 (step S131). Here, stapling and half-folding are assumed to be in the prohibition relationship. In this case, half-folding to which "necessary" is added is selected as the printing setting. Therefore, the smart speaker 10 informs the user U that stapling and half-folding cannot be designated at the same time, and thus, printing is performed with only half-folding (step S132). The printing instruction for issuing the instruction to perform printing with half-folding is transmitted to the printing apparatus 40 from the smart speaker 10 (step S133). Accordingly, the printing apparatus 40 prints the half-folded printed matter P (step S134).

While the priority is changed by adding the keyword to the requested setting, the present invention is not limited thereto. The priority may be changed by speaking the requested setting earlier in the speaking order and the requested setting later in the speaking order in a distinguishable manner. For example, in a case where the requested setting later in the speaking order is spoken in a highlighted manner compared to the requested setting earlier in the speaking order, the requested setting later in the speaking order may be decided as the printing setting. Here, speaking the requested setting with a loud voice is illustrated as speaking the requested setting in a highlighted manner.

The requested setting earlier in the speaking order may be spoken in a highlighted manner, or the requested setting later in the speaking order may be spoken in a highlighted manner. Hereinafter, a case of deciding the requested setting later in the speaking order as the printing setting by speaking the requested setting later in the speaking order in a highlighted manner will be illustratively described.

Functional Configuration of Server

Figure 8:
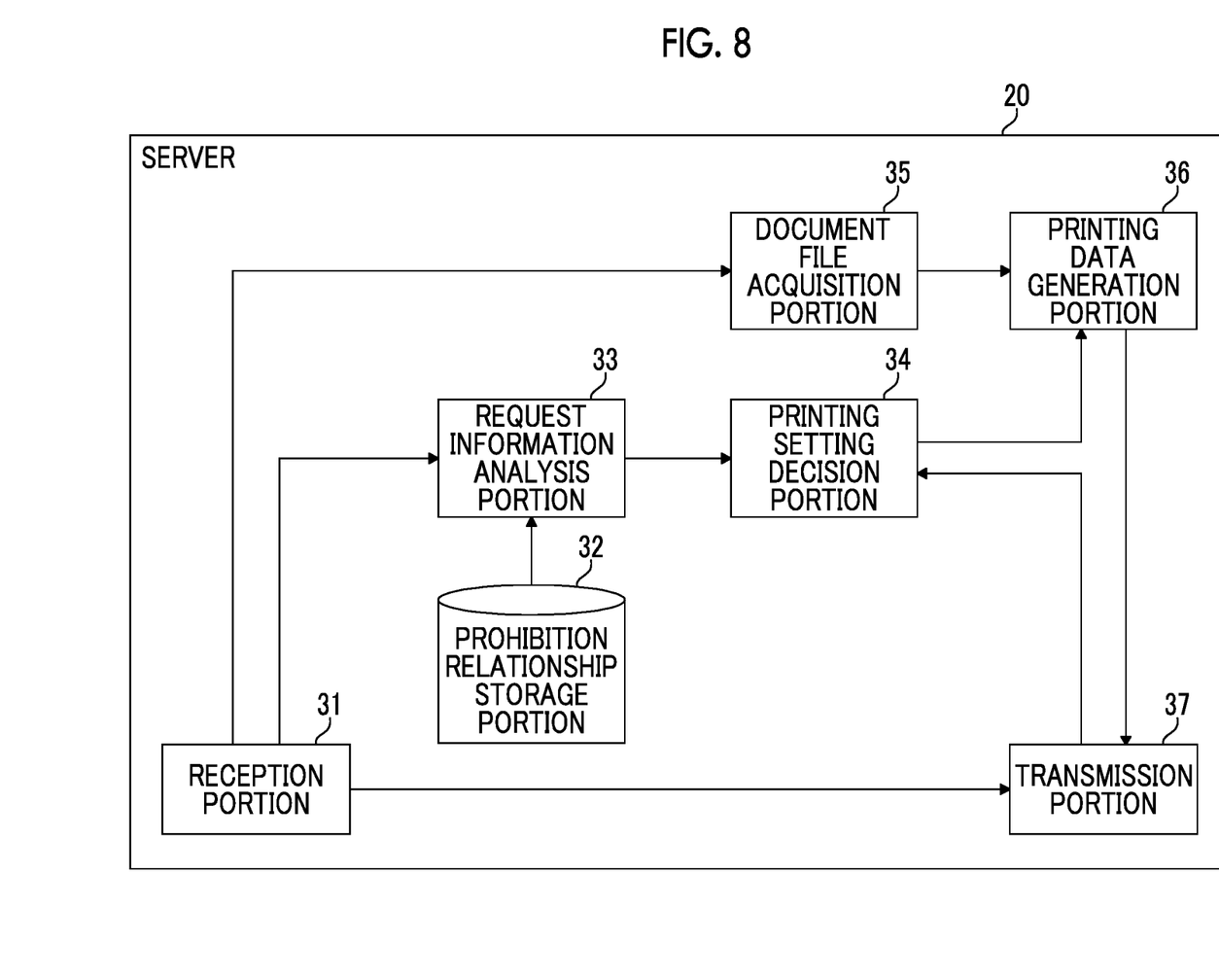
FIG. 8 is a block diagram illustrating a functional configuration example of the server in the exemplary embodiment of the present invention.

FIG. 8 is a block diagram illustrating a functional configuration example of the server 20 in the present exemplary embodiment. As illustrated, the server 20 includes a reception portion 31, a prohibition relationship storage portion 32, a request information analysis portion 33, a printing setting decision portion 34, a document file acquisition portion 35, a printing data generation portion 36, and a transmission portion 37.

The reception portion 31 receives the request information from the smart speaker 10. Here, in a case where the user makes the printing request by voice, the smart speaker 10 recognizes the voice of the printing request, generates the request information as information for requesting printing based on the result of recognition, and transmits the request information. In the present exemplary embodiment, the request information is used as an example of the request for the process based on the spoken voice of the user. This process of the reception portion 31 is performed as an example of reception of the request for the process.

The prohibition relationship storage portion 32 stores information related to the prohibition relationship between the printing settings. For example, the prohibition relationship storage portion 32 stores the prohibition relationship between stapling and half-folding illustrated in FIG. 5 to FIG. 7.

The request information analysis portion 33 receives the request information received by the reception portion 31 and analyzes the request information.

Specifically, first, the request information analysis portion 33 determines whether or not the request information includes a plurality of requested settings, and the plurality of requested settings include two requested settings in the prohibition relationship. In the present exemplary embodiment, this process of the request information analysis portion 33 is performed as an example of determining that the request includes the first setting and the second setting in the prohibition relationship.

In addition, in a case where a determination that the request information includes a plurality of requested settings, and the plurality of requested settings include two requested setting in the prohibition relationship is made, the request information analysis portion 33 determines whether or not the two requested settings in the prohibition relationship are included in different speaking units. Here, the speaking unit refers to one unit of speaking of the user. For example, the request information analysis portion 33 may handle speaking including a voice indicating a content of the requested setting and a voice indicating a request for the requested setting as the speaking unit. In FIG. 5 to FIG. 7, the content of the requested setting is, for example, "stapling" and "half-folding". The request for the requested setting is, for example, "by setting". In the present exemplary embodiment, this process of the request information analysis portion 33 is performed as an example of determining that a first speaking unit including the first setting is different from a second speaking unit including the second setting, and also as an example of specifying a speaking unit including the first setting and a request for the first setting as the first speaking unit and specifying a speaking unit including the second setting and a request for the second setting as the second speaking unit.

Furthermore, in a case where a determination that the request information includes a plurality of requested settings, the plurality of requested settings include two requested settings in the prohibition relationship, and the two requested settings in the prohibition relationship are in one speaking unit is made, the request information analysis portion 33 determines whether or not the requested setting spoken later is spoken in a highlighted manner. In the present exemplary embodiment, this process of the request information analysis portion 33 is performed as an example of determining that the first setting and the second setting are spoken in one speaking unit, and the second setting is spoken in a distinguishable manner from the first setting. Here, for example, a case where the requested setting spoken later is spoken in a highlighted manner includes a case where the requested setting spoken later is spoken by adding the keyword to the requested setting. In this case, a case where the requested setting spoken later is spoken by adding the keyword to the requested setting is an example of a case where the second setting is spoken after a predetermined phrase is added to the second setting.

The printing setting decision portion 34 decides any requested setting as the printing setting based on an analysis result from the request information analysis portion 33, the speaking order of the requested settings in the request information, and information from the transmission portion 37.

Specifically, first, a case where the analysis result from the request information analysis portion 33 indicates that the request information includes a plurality of requested settings, and the plurality of requested settings include two requested settings in the prohibition relationship is considered. In this case, the printing setting decision portion 34 decides the requested setting that is spoken earlier out of the two requested settings in the prohibition relationship as the printing setting. In the present exemplary embodiment, this process of the printing setting decision portion 34 is performed as an example of, in a case where the request includes the first setting and the second setting in the prohibition relationship, performing a control for performing the process with the first setting in a case where the first setting is spoken earlier than the second setting in the spoken voice.

In addition, a case where the analysis result from the request information analysis portion 33 indicates that the request information includes a plurality of requested settings, the plurality of requested settings include two requested settings in the prohibition relationship, and the two requested settings in the prohibition relationship are included in different speaking units is considered. In this case, the printing setting decision portion 34 decides the requested setting that is spoken later out of the two requested settings in the prohibition relationship as the printing setting. In the present exemplary embodiment, this process of the printing setting decision portion 34 is performed as an example of, even in a case where the first setting is spoken earlier than the second setting in the spoken voice, performing a control for performing the process with the second setting on a condition that the first speaking unit including the first setting is different from the second speaking unit including the second setting. Alternatively, in addition to the example, in a case where the smart speaker 10 responds between the earlier speaking unit and the later speaking unit, the printing setting decision portion 34 may decide the requested setting that is spoken later out of the two requested settings in the prohibition relationship as the printing setting. Here, for example, the response of the smart speaker 10 between the earlier speaking unit and the later speaking unit may be notified from the transmission portion 37. In the present exemplary embodiment, this process of the printing setting decision portion 34 is performed as an example of performing a control for performing the process with the second setting on a further condition that the second speaking unit is spoken later than a response voice that is output in response to the first speaking unit. In a case where the smart speaker 10 does not respond between the earlier speaking unit and the later speaking unit, the printing setting decision portion 34 decides the requested setting that is spoken earlier out of the two requested settings in the prohibition relationship as the printing setting.

Furthermore, a case where the analysis result from the request information analysis portion 33 indicates that the request information includes a plurality of requested settings, the plurality of requested settings include two requested settings in the prohibition relationship, the two requested settings in the prohibition relationship are in one speaking unit, and the requested setting spoken later is spoken in a highlighted manner is considered. In this case, the printing setting decision portion 34 decides the requested setting that is spoken later out of the two requested settings in the prohibition relationship as the printing setting. In the present exemplary embodiment, this process of the printing setting decision portion 34 is performed as an example of, even in a case where the first setting is spoken earlier than the second setting, and the first setting and the second setting are spoken in one speaking unit in the spoken voice, performing a control for performing the process with the second setting in a case where the second setting is spoken in a distinguishable manner from the first setting. In a case where the requested setting spoken later is not spoken in a highlighted manner, the printing setting decision portion 34 decides the requested setting that is spoken earlier out of the two requested settings in the prohibition relationship as the printing setting.

The document file acquisition portion 35 receives the request information received by the reception portion 31 and acquires the document of a printing target included in the request information.

In a case where the printing setting decision portion decides the printing setting, and the document file acquisition portion 35 acquires a document file, the printing data generation portion 36 generates the printing data that is data for issuing an instruction to print the document file with the printing setting.

In a case where the printing data generation portion 36 generates the printing data, the transmission portion 37 transmits, to the smart speaker 10, response information for issuing an instruction for a response indicating that the document file acquired by the document file acquisition portion 35 is printed with the printing setting decided by the printing setting decision portion 34. In the present exemplary embodiment, this process of the transmission portion 37 is performed as an example of performing a control for outputting a response voice indicating that the process is performed with the first setting.

In addition, in a case where the printing data generation portion 36 generates the printing data, the transmission portion 37 transmits the printing data to the printing apparatus 40.

Furthermore, when the reception portion 31 receives the request information, the transmission portion 37 may transmit the response information for issuing an instruction for a response to the request information to the smart speaker 10. In this case, the printing setting decision portion 34 is notified that the response information is transmitted to the smart speaker 10.

Operation of Server 20

Figure 9:
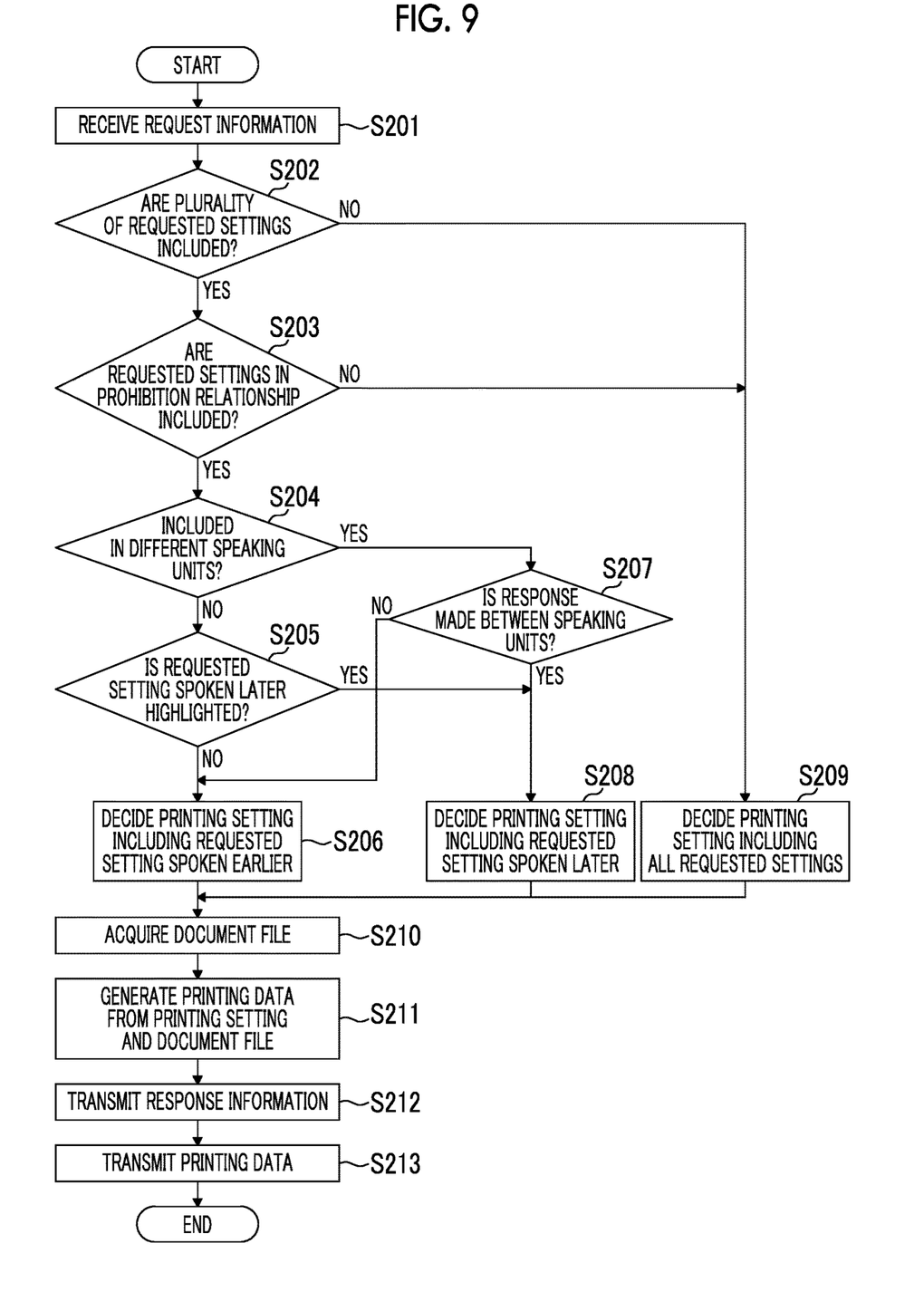
FIG. 9 is a flowchart illustrating an operation example of the server in the exemplary embodiment of the present invention.

FIG. 9 is a flowchart illustrating an operation example of the server 20 in the present exemplary embodiment.

As illustrated, in the server 20, first, the reception portion 31 receives the request information from the smart speaker 10 (step S201).

Next, the request information analysis portion 33 determines whether or not the request information received in step S201 includes a plurality of requested settings (step S202).

In a case where a determination that the request information includes a plurality of requested settings is made in step S202, the request information analysis portion 33 determines whether or not the plurality of requested settings include two requested settings in the prohibition relationship (step S203).

In a case where a determination that the plurality of requested settings include two requested settings in the prohibition relationship is made in step S203, the request information analysis portion 33 determines whether or not the two requested settings in the prohibition relationship are included in different speaking units (step S204).

In step S204, a determination that the two requested settings in the prohibition relationship are not included in different speaking units is assumed. That is, a determination that the two requested settings in the prohibition relationship are included in one speaking unit is assumed. Then, the request information analysis portion 33 determines whether or not the requested setting spoken later is spoken in a highlighted manner (step S205). For example, the request information analysis portion 33 determines whether or not the requested setting spoken later is spoken by adding the keyword to the requested setting.

In a case where a determination that the requested setting spoken later is not spoken in a highlighted manner is made in step S205, the printing setting decision portion decides the printing setting including the requested setting spoken earlier (step S206). That is, the printing setting decision portion 34 decides the printing setting that includes the requested setting spoken earlier and another requested setting not in the prohibition relationship and does not include the requested setting spoken later.

In a case where a determination that the requested setting spoken later is spoken in a highlighted manner is made in step S205, the printing setting decision portion 34 decides the printing setting including the requested setting spoken later (step S208). That is, the printing setting decision portion 34 decides the printing setting that includes the requested setting spoken later and another requested setting not in the prohibition relationship and does not include the requested setting spoken earlier.

In a case where a determination that the two requested settings in the prohibition relationship are included in different speaking units is made in step S204, the printing setting decision portion 34 determines whether or not the smart speaker 10 responds between the earlier speaking unit and the later speaking unit (step S207). In a case where a determination that the smart speaker 10 responds between the earlier speaking unit and the later speaking unit is made, the printing setting decision portion 34 decides the printing setting including the requested setting spoken later (step S208). In addition, in a case where a determination that the smart speaker 10 does not respond between the earlier speaking unit and the later speaking unit is made, the printing setting decision portion 34 decides the printing setting including the requested setting spoken earlier (step S206).

In a case where a determination that the request information does not include a plurality of requested settings is made in step S202, the printing setting decision portion 34 decides the printing setting including all requested settings (step S209). That is, in a case where a determination that the request information includes one requested setting is made, the printing setting decision portion 34 decides the printing setting including the requested setting. In addition, in a case where a determination that the plurality of requested settings do not include two requested settings in the prohibition relationship is made in step S203, the printing setting decision portion 34 decides the printing setting including all requested settings (step S209).

Next, the document file acquisition portion 35 acquires the document file specified by the request information received in step S201 (step S210).

Accordingly, the printing data generation portion 36 generates the printing data from the printing setting decided in step S206, step S208, or step S209 and the document file acquired in step S210 (step S211).

Then, the transmission portion 37 transmits, to the smart speaker 10, the response information for issuing an instruction for a response indicating that the document file is printed with the printing setting (step S212). In addition, the transmission portion 37 transmits the printing data generated in step S211 to the printing apparatus 40 (step S213). Accordingly, in the printing apparatus 40, an image based on the printing data is printed on the recording medium.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The process performed by the server 20 in the present exemplary embodiment is prepared as, for example, programs such as application software.

That is, a first program implementing the present exemplary embodiment is perceived as a program causing a computer to implement a function of receiving a request for a process based on a spoken voice of a user, and a function of, in a case where the request includes a first setting and a second setting that are in a prohibition relationship, performing a control for performing the process with the first setting in a case where the first setting is spoken earlier than the second setting in the spoken voice.

In addition, a second program implementing the present exemplary embodiment is perceived as a program causing a computer to implement a function of receiving a request for a process based on a spoken voice of a user, and a function of, in a case where the request includes a first setting and a second setting that are in a prohibition relationship, performing a control for performing the process with, out of the first setting and the second setting, a setting different from a setting which is selected in a case where a request for the process based on an operation on a screen is received.

The programs implementing the present exemplary embodiment can be not only provided by communication means but also provided by storing the programs in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive a request for a process based on a spoken voice of a user; and
in a case where the request in the spoken voice of the user includes a first setting and a second setting that are in a prohibition relationship, determine a speaking order of the first setting and the second setting in the spoken voice of the user; and
perform a control for performing the process with the first setting in a case where the first setting is determined spoken earlier than the second setting in the spoken voice of the user.

2. The information processing apparatus according to claim 1, wherein the processor is configured to:
perform a control for outputting a response voice indicating that the process is performed with the first setting.

3. The information processing apparatus according to claim 1, wherein the processor is configured to:
even in a case where the first setting is spoken earlier than the second setting in the spoken voice, perform a control for performing the process with the second setting on a condition that a first speaking unit including the first setting is different from a second speaking unit including the second setting.

4. The information processing apparatus according to claim 3, wherein the processor is configured to:
specify a speaking unit including the first setting and a request for the first setting as the first speaking unit, and specify a speaking unit including the second setting and a request for the second setting as the second speaking unit.

5. The information processing apparatus according to claim 3, wherein the processor is configured to:
perform a control for performing the process with the second setting on a further condition that the second speaking unit is spoken later than a response voice output in response to the first speaking unit.

6. The information processing apparatus according to claim 1, wherein the processor is configured to:
even in a case where the first setting is spoken earlier than the second setting, and the first setting and the second setting are spoken in one speaking unit in the spoken voice, perform a control for performing the process with the second setting in a case where the second setting is spoken in a distinguishable manner from the first setting.

7. The information processing apparatus according to claim 6,
wherein speaking the second setting in a distinguishable manner from the first setting includes speaking the second setting by adding a predetermined phrase to the second setting.

8. The information processing apparatus according to claim 1,
wherein the first setting and the second setting in the prohibition relationship are settings being incompatible.

9. An information processing apparatus comprising:
a processor configured to:
receive a request for a process based on a spoken voice of a user; and
in a case where the request in the spoken voice of the user includes a first setting and a second setting that are in a prohibition relationship, perform a control for performing the process with, out of the first setting and the second setting, a setting different from a setting that is selected in a case where a request for the process based on an operation on a screen is received.

10. A non-transitory computer readable medium storing a program causing a computer to implement:
a function of receiving a request for a process based on a spoken voice of a user; and
a function of, in a case where the request in the spoken voice of the user includes a first setting and a second setting that are in a prohibition relationship, determine a speaking order of the first setting and the second setting in the spoken voice of the user; and
a function of performing a control for performing the process with the first setting in a case where the first setting is determined spoken earlier than the second setting in the spoken voice of the user.

11. The non-transitory computer readable medium according to claim 10,
wherein the first setting and the second setting in the prohibition relationship are settings being incompatible.

12. A non-transitory computer readable medium storing a program causing a computer to implement:
a function of receiving a request for a process based on a spoken voice of a user; and
a function of, in a case where the request in the spoken voice of the user includes a first setting and a second setting that are in a prohibition relationship, performing a control for performing the process with, out of the first setting and the second setting, a setting different from a setting that is selected in a case where a request for the process based on an operation on a screen is received.

* * * * *